No. 812,649. PATENTED FEB. 13, 1906.
G. G. GREENE.
HAME FASTENER.
APPLICATION FILED SEPT. 29, 1905.

Witnesses
E. K. Stewart,
C. N. Woodward

Glenn G. Greene Inventor
by C. A. Snow & Co
Attorneys

UNITED STATES PATENT OFFICE.

GLENN G. GREENE, OF WARREN, PENNSYLVANIA.

HAME-FASTENER.

No. 812,649.   Specification of Letters Patent.   Patented Feb. 13, 1906.

Application filed September 29, 1905. Serial No. 280,655.

*To all whom it may concern:*

Be it known that I, GLENN G. GREENE, a citizen of the United States, residing at Warren, in the county of Warren and State of Pennsylvania, have invented a new and useful Hame-Fastener, of which the following is a specification.

This invention relates to hame-fasteners, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

Figure 1:
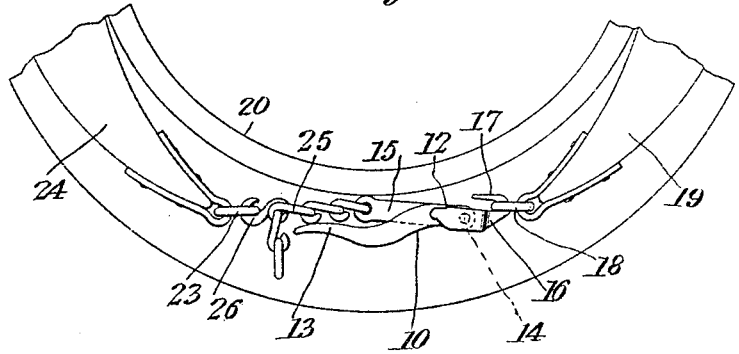
Figure 2:
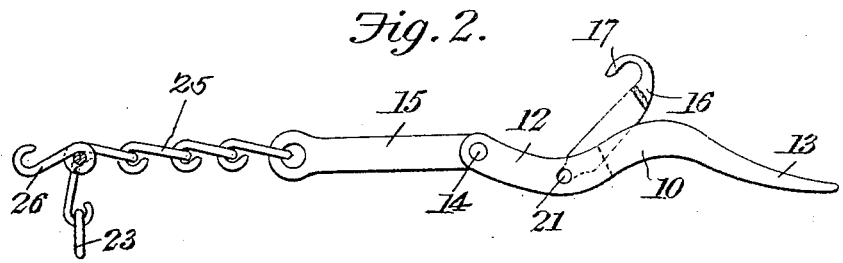
Figure 3:
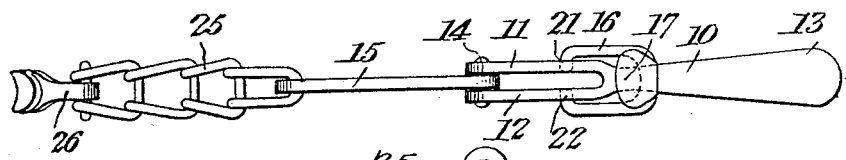
Figure 4:
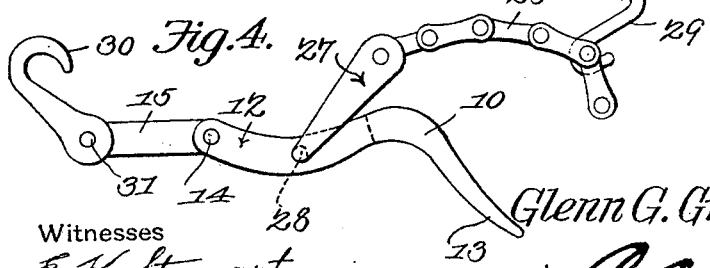

In the drawings thus employed, Figure 1 is a front view of a portion of a horse-collar and the hames operating thereon with the improved fastening device applied in closed position. Fig. 2 is an enlarged side view of the improved device detached and distended. Fig. 3 is a plan view of the device as shown in Fig. 2. Fig. 4 is a view similar to Fig. 2, illustrating a modification of the device.

The improved device comprises a lever 10, formed with spaced sides 11 12 at one end and a curved handle 13 at the other end. Pivoted at 14, between the spaced sides at one end of the lever, is a link 15, the link being thus foldable between the spaced sides of the lever when the device is in closed or locked position, as in Fig. 1. Connected to the lever 10 is an arm 16, terminating at one end in a hook 17 for engaging the ring 18 of the hame 19 at one side of the collar (indicated at 20) and with the other end of the lever divided and pivoted at 21 22 to the spaced sides 11 12 of the lever 10. The arm 16 thus folds over the pivotally-united ends of the lever 10 and link 15 when the device is closed, as in Fig. 1. A section of chain 25 is connected to the free end of the link 15, and coupled to this chain is a hook 26, adapted for engagement with the ring 23 of the other hame, (represented at 24.) The hook 26 is adjustable in the links of the chain to enable the device to be lengthened and shortened, to adapt it to different sizes of collars for horses.

By this simple arrangement it will be obvious that when the lever 10 is moved over into the position shown in Figs. 2 and 3 the hames will be released, and one or both of the hooks may be disconnected and the hames removed, and then when the lever is moved into the position shown in Fig. 1 the hames will be drawn together and a strong leverage force exerted to hold them in closed position, the link 15 folding into the space between the sides of the lever and the arm 16 folding over the divided end of the lever and of the link held between them.

The line of draft between the pivots 21 22 and the ring 18 of the hame member 19 is disposed inside or above the pivot 14 between the link and lever, thereby firmly locking the parts together.

The parts are preferably of steel, malleable iron, or other suitable material.

In Fig. 4 is shown a modified arrangement of the parts which may be employed in the smaller sizes of harness where the hame ends come closer together, and consists merely in transposing the location of the hook 16 17 and the chain 25 and its hook 26. In the modified structure the chain 25 is coupled to the free end of an arm 27, the latter pivoted at 28 to the lever 10, and with a hook 29, adapted for detachable connection to the links of the chain, the hook 29 being of the same form and performing the same functions as the hooks 16 17 in the structure shown in Figs. 1, 2, and 3. In the modified structure a hook 30 is pivoted at 31 to the free end of the link 15 and performs the same function as the hook 26 in the structure shown in Figs. 1, 2, and 3. It will thus be obvious that the modified structure shown in Fig. 4 is not a departure from the principle of the invention, as all the parts are substantially the same as in the structure shown in Figs. 1, 2, and 3 and perform the same functions, both unitedly and individually.

Having thus described the invention, what is claimed is—

A hame-fastener comprising a lever formed with spaced sides, a link pivoted at one end to one end of said lever and foldable between the spaced sides of the same, an arm formed with spaced sides and pivoted at one end to the spaced sides of said lever, and a flexible element and a hook movably coupled respectively to said link and to said arm, and a hook adjustably connected to said flexible element.

In testimony that I claim the foregoing as my own I have hereto affixed my signature in the presence of two witnesses.

GLENN G. GREENE.

Witnesses:
J. G. GREENE,
MAY HOLLISTER.